United States Patent [19]

De Vito et al.

[11] 4,085,245

[45] Apr. 18, 1978

[54] TRANSPARENCIES FOR COLOR XEROGRAPHIC COPIES

[75] Inventors: Michael G. De Vito, Macedon; Francis J. Wieloch, Penfield, both of N.Y.

[73] Assignee: Xerox Corporation, Stamford, Conn.

[21] Appl. No.: 677,341

[22] Filed: Apr. 15, 1976

[51] Int. Cl.[2] .......................... B32B 5/16; B32B 5/30; B32B 27/06

[52] U.S. Cl. .................................... 428/215; 96/1.2; 96/1.4; 427/13; 427/146; 428/336; 428/337; 428/331; 428/483; 428/913

[58] Field of Search ............... 428/914, 331, 332, 336, 428/337, 483, 500, 515, 518, 215; 260/567.6 M; 250/8.8 R; 96/1.2, 1.4; 427/13, 146

[56] References Cited

U.S. PATENT DOCUMENTS

| | | | |
|---|---|---|---|
| 2,921,869 | 1/1960 | McBride | 428/331 |
| 2,976,184 | 3/1961 | Blatz | 428/331 |
| 3,049,457 | 8/1962 | Peshin et al. | 428/914 X |
| 3,428,682 | 2/1969 | Egan et al. | 260/567.6 M |
| 3,456,013 | 7/1969 | Egan et al. | 260/567.6 M |
| 3,664,952 | 5/1972 | Maske | 252/8.8 R X |
| 3,711,414 | 1/1973 | Hewitt et al. | 252/8.8 R X |
| 3,786,518 | 1/1974 | Atherton | 428/331 X |
| 3,790,435 | 2/1974 | Tanba et al. | 428/331 X |
| 3,854,942 | 12/1974 | Akman | 428/500 X |
| 3,936,559 | 2/1976 | Newman | 428/518 X |
| 3,975,563 | 8/1976 | Franer et al. | 428/914 X |

*Primary Examiner*—George F. Lesmes
*Assistant Examiner*—R. Eugene Varndell, Jr.
*Attorney, Agent, or Firm*—J. J. Ralabate; J. P. O'Sullivan; J. L. Jeffers

[57] ABSTRACT

Disclosed is a transparency for use in electrostatographic reproduction, particularly in the multi-color mode of such reproduction. The transparency comprises:

a) a base of transparent polyester sheet;

b) a second layer adherent to the surface of said polyester sheet of a mixture of an acrylic polymer and a copolymer of vinyl acetate and vinyl chloride said second layer having uniformly dispersed therein:

i. particulate silica having a particle size range of from about 2 to 70 millimicrons in its longest dimension and being present in an amount of from about 0.25 to 1.5 weight percent of said second layer, and ii. a salt formed from an anion of a carboxylic acid having 1 to 37 carbon atoms or a dimeric fatty acid having 12 to 36 carbon atoms and a cation characterized by the formula:

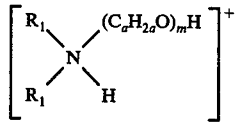

wherein $R_1$ is a saturated straight chained or branched chain aliphatic hydrocarbon radical of 2 to 24 carbon atoms or an unsaturated straight chained or branched chain hydrocarbon radical of 3 to 24 carbon atoms, a is 2 or 3 and m is a number from 2 to 40.

13 Claims, No Drawings

TRANSPARENCIES FOR COLOR XEROGRAPHIC COPIES

BACKGROUND OF THE INVENTION

The present invention relates to electrostatographic reproduction and more particularly to a transparent sheet material for making color transparencies by electrostatographic reproduction.

The art of electrostatographic copying is presently well developed and generally utilizes an electrostatic charge pattern on a photosensitive plate which is developed by contacting it with a particulate, electroscopic marking material known as toner. The toner is a pigment/resin mixture, which in the case of black and white reproduction, employs carbon black as the pigment. Recently, color electrostatographic copying has become commercially feasible. A commercial device for color copying is the Xerox 6500 Color Copier. This device employs three separate toners, pigmented yellow, cyan and magenta, and combinations thereof to provide multicolored copies.

The most common use of electrostatographic copiers involves transferring the toner image to plain paper. Fusing the toner into the paper provides a permanent copy. Another use relates to the substitution of a transparent sheet for the paper and transfer of the toner image thereto to provide imaged transparencies suitable for use in conjunction with overhead projectors. These transparent sheets are typically made from thin films of one or more organic resins. Polyester films are useful due to their physical properties but present the problem of poor toner adherence thereto. Typically a second resin film compatible with the toner is applied to one surface of the polyester base sheet to provide a two layered structure.

Two layered transparencies have been found to work well when each of the layers is selected of the proper material. However, two problems are sometimes encountered. The first is related to the electrostatic attraction between adjacent transparencies when they are stacked one on top of the other. This attraction complicates the process of automatically feeding the transparencies to provide a continuous process when it is desired to image several sheets. The other problem is related to toner disturbances which distort the image during transfer of the toner from the photosensitive plate to the blank transparency. This problem is especially acute when a multi-color transparency is being prepared.

It would be desirable and it is an object of the present invention to provide a novel transparency suitable for imaging by electrostatographic means.

Another object is to provide such a transparency which is especially suitable for multi-colored imaging.

An additional object is to provide such a transparency which can be readily fed from a stack thereof by automated means.

SUMMARY OF THE INVENTION

The present invention is a novel transparency for electrostatographic copying. The transparency comprises:

a. a base layer of a transparent, heat stabilized polyester sheet, b. a second layer adherent to the surface of said polyester sheet of a mixture of an acrylic polymer and a copolymer of vinyl acetate and vinyl chloride said layer having uniformly dispersed therein:

i. particulate silica having a mean particle size of from about 2 to 70 millimicrons in its longest dimension and being present in an amount of from about 0.25 to about 1.5 weight percent of said second layer, and ii. a salt formed from an anion of a carboxylic acid having 1 to 37 carbon atoms or a dimeric fatty acid having 12 to 36 carbon atoms and a cation characterized by the formula:

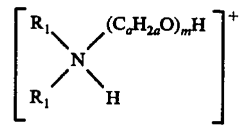

wherein $R_1$ is a saturated straight chained or branched chain aliphatic hydrocarbon radical of 2 to 24 carbon atoms or an unsaturated straight chained or branch chain hydrocarbon radical of 3 to 24 carbon atoms, $a$ is 2 or 3 and $m$ is a number from 2 to 40.

DETAILED DESCRIPTION AND PREFERRED EMBODIMENTS

Suitable polyester sheet materials which may be used in the present invention are formed from condensation products of a bifunctional dicarboxylic acid and a dihydric alcohol and possess dimensional stability at elevated temperatures. The preferred condensation products are formed with aromatic dicarboxylic acids; however, products formed with dicarboxylic acids such as adipic acid, sebacic acid and the like may be used. The polyester may be comprised of any of the high melting, difficulty soluble, usually microcrystalline, thermally oriented, linear, highly polymerized esters of terephthalic acid and glycols of the series $HO-(CH_{2n})-OH$, where $n$ is a number within the range of 2 to 10. The preferred polyester is polyethylene terephthalate.

The polyester used as the base sheet in the transparencies of the present invention need not consist solely of a dicarboxylic acid and simple glycol units since some of the glycol units may react to form polyglycols, and a small percentage of such polyglycol units may be present. For example, when ethylene glycol is a reactant, the polyester may contain a small amount of diethylene glycol units.

Preferably, the polyester is a heat stable, highly polymeric, linear polyethylene terephthalate sheet which has been biaxially oriented and heat set to provide improved dimensional stability. Those materials which form sheets exhibiting cross and trans direction shrinkage of less than 1.0% when maintained at 170° C for 30 minutes are especially suitable. A suitable thickness for the polyester base sheet ranges from about 2 to 7 mil.

Attempts to form an adherent electrostatographic image upon the unmodified surface of a polyester film have not been successful. This is the case because the toner image fails to tenaciously adhere to the sheet and is totally or partially displaced upon contact with another surface, thereby either completely destroying the image or producing an excessive smudge which renders the sheet unsuitable for use as a transparency.

The second layer comprises a mixture of two polymers. The first polymer, which is normally the major ingredient, is an acrylic resin such as poly(n-alkyl methacrylate). The acrylic resin is used in the second layer to improve adhesion and fixing of the toner image and is conveniently selected from among the various poly n-alkyl acrylic resins such as the polymerized n-alkyl methacrylates which are marketed by E. I. DuPont de Nemours and Co. under the tradename Elvacite. Although various alkylated methacrylates will be suitable for use in the present invention, the n-butyl methacrylates such as Elvacite 2044, 2045 and 2046 are preferred.

The vinyl chloride-acetate copolymer resin which is used in the present invention may be any available form of this material which will form a clear film in combination with the acrylic polymer. Suitable resins include, for example, such a copolymer marketed by The Union Carbide Corporation under the tradename Bakelite VMCH, a coplymer of vinyl chloride/vinylacetate with a small amount of a dibasic acid interpolymerized therein. The vinyl chloride-acetate copolymer imparts the necessary toughness to the film and enhances its adhesion to the polyester base sheet.

The two resins are combined in an appropriate solvent to form a solution suitable for solvent coating on the polyester support sheet. Solvent selection is not critical since any organic solvent which will dissolve the resins and is sufficiently volatile to be readily evaporated therefrom to leave a reasonably transparent film may be used. A preferred solvent composition is a mixture of cyclohexanone and another ketone, typically methyl ethyl ketone. These solvents are preferably mixed in a ratio of between about 1 part cyclohexanone to 2.5 to 3.0 parts of the other ketone, although variations in the amount of these solvents may be made depending on the specific resins employed.

The weight ratio of the two resins in the second layer is preferably in the range of about 70 parts of the acrylic polymer to about 30 parts of the vinyl acetate/vinyl chloride copolymer with a weight ratio of about 40:60 to 80:20 being typical.

To the resin solution is added particulate silica of particle size from about 2 to 70 millimicrons in the longest dimension. Optimum particle size will vary depending on the desired thickness of the second layer of the transparency. The silica serves as a friction reducing agent which allows peak to support sheet contact since the silica usually forms peaks which are higher than the surrounding thermoplastic matrix thereby reducing newton ring formation on the transparency and keeping the sheets separated. This separation is desirable since it eliminates the problem of multiple sheets being fed during automated color transparency preparation. This is the case because the peaks formed by the silica prevent the uncoated surface of the polyester base sheet from coming in full contact with the soft thermoplastic second layer of the next adjacent transparency.

The thickness of this second layer of the transparency should not be so great that discoloration results. On the other hand, a layer that is too thin will result in loss of toner adhesion. It will be apparent to those skilled in the art that some routine experimentation may be required to determine the optimum layer thickness for a particular composition.

The fourth component of the second layer is an anti-static agent. It has been found that solid area coverage with cyan (the last of the 3 colored toners to be applied in the Xerox 6500 Color Copier) is not as complete as might be desirable in the absence of an anti-static agent in the toner receiving layer of the transparency. This problem (which has come to be known as cyan static) appears to be related to the high resistivity of the transparency and is alleviated by the incorporation of an anti-static agent. However, if the anti-static agent selected increases the conductivity of the sheet too much, a problem known as hollow characters is observed. Hollow characters are observed as incomplete line copy where all 3 colored toners are combined to form black images. We have discovered that a particular class of anti-static agents can be used to alleviate the cyan static problem without causing hollow characters and that these agents can be employed over a fairly wide range of concentrations to achieve the desired results.

The anti-static agents which are advantageously used in the present context are salts formed from an anion of a carboxylic acid having 1 to 37 carbon atoms or a dimeric fatty acid having 12 to 36 carbon atoms and a cation characterized by the formula

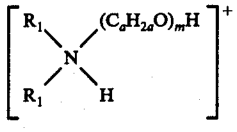

In the above formula, $R_1$ is a saturated straight chained or branched chain aliphatic hydrocarbon radical of 2 to 24 carbon atoms or an unsaturated straight chain or branched chain hydrocarbon radical of 3 to 24 carbon atoms, *a* is 2 or 3 and *m* is a number from 2 to 40. These quaternary amine-alkylene oxide-adduct-salts may be prepared from ethylene oxide, propylene oxide or mixtures thereof. Examples of secondary amine starting materials for the amine-alkylene oxide adducts are alkylamines having 2 to 24 carbon atoms in the alkyl portion such as diethylamine, diisopropyl amine, dibutylamine, ethylbutylamine, dihexylamine, dioctylamine, dicoconut fatty amine as well as dialkenylamines having 3 to 24 carbon atoms in the alkenyl group such as dioleylamine.

Examples of compounds which may be employed as the anti-static agent are the following quaternary amine-alkylene oxide adduct/organic acid salts: ethylamine . 10 propylene oxide-caproic acid; butylamine . 10 ethylene oxide . acetic acid; butylamine . 4 ethylene oxide-linoleic acid; butylamine . 4 ethylene oxide-ricinoleic acid; butylamine . 10 ethylene oxide-dimeric $C_{12}$ to $C_{18}$ fatty acid; coconut fatty amine . 10 ethylene oxide-acetic acid and coconut fatty amine . 15 ethylene oxide-capronic acid. The anti-static agent is combined with the two resins in solution having silica dispersed therein and upon thorough mixing the result is a solution/dispersion of the four ingredients of the second layer of the transparency in the organic liquid. The concentration of anti-static agent in the second layer should be within the range of about 2.5 to 12.5 weight percent of the layer. Too little of this material will not produce the desired enhancement of image quality whereas too much will soften the transparency coating to an undesirable extent. Preferably, the concentration is in the range of from 6 to 9 weight percent of the coated film.

After preparation, the coating composition is applied to the transparent polyester film by techniques known to those skilled in the art of paper coating. Various techniques such as roller coating, air knife coating, doctor blade coating, fountain coating or any other means for uniform application of the solution/dispersion may be employed. Typically, the second layer will average from about 0.05 to 0.5 mil in thickness (preferably 0.1 to 0.4) so that sufficient solution/dispersion is applied to provide a layer of the requisite thickness after evaporation of the solvent. Since the polymeric coating on the polyester base sheet is in the nature of an extremely thin film, no significant impairment of the transparency of the sheet itself results from its presence and the transparency formed therefrom by electrostatographic imaging techniques possesses the requisite degree of clarity to be satisfactory from most visual education purposes.

The finished transparency may be imaged by the use of commercially available color electrostatographic copiers such as the Xerox 6500 Color Copier. Toners employed in this type of copier use substractive primary colors such as yellow, cyan (blue/green) and magenta. These in turn are used to reproduce a wide gamut of colors normally found in the color original. For purposes of illustration, when substractive imaging of the yellow and cyan colorants takes place, greens are obtained. Likewise, the mixing of magenta and yellow colorant in varying amounts reproduces reds, while combining the cyan with magenta results in the reproduction of blues. Mixtures of equal amounts of each toner will, of course, produce a black image. It is not intended that the transparency of the instant invention be limited by particular variations in the multicolored xerographic imaging processes that might be employed or with the equipment used in such processes. Nevertheless, for purposes of illustration, a suitable process for color imaging begins with proper discernment of the color composition of the original subject matter and the recording thereof. This may be conveniently accomplished by sequential optical scanning of the color original a number of times to formulate a sequence of latent electrostatic images which correspond to the primary colors in the original. This is accomplished by the light image passing through an appropriate color filter so that the latent image is, in effect, color separated according to the various primary colors. Theoretically, the latent image which is formed by passing the light image through a green filter should require the magentas (the complementary color) as areas of relatively high charge density on the drum surface, while the green (the separated color) should cause a low charge density level. The magentas are then made visible by applying a green absorbing magenta toner to the image bearing member. By the same token a blue separation is developed with a cyan toner. The three developed color separations are then brought together in registration upon the final sheet of support material to produce a multicolored facsimile of the original colored document copy.

It is the multicomponent developer system used in a subtractive color to color reproduction process which presents numerous problems when a color transparency is produced thereby. As previously mentioned, these problems involve toner disturbances resulting when the toner image is transferred to the transparency and are observed as cyan static and hollow characters on the transparency. It is the cyan static that the present invention is designed to alleviate without causing the formation of hollow characters.

The invention is further illustrated by the following example in which all parts are by weight of the total composition.

EXAMPLE I

Transparencies according to the present invention are prepared using heat stabilized Mylar D obtained from DuPont as the base sheet.

The second layer is prepared by dissolving 70 parts of the acrylic resin (Elvacite 2044 - DuPont) and 30 parts of the vinyl chloride-acetate copolymer (VMCH - Union Carbide) in 510 parts methyl ethyl ketone and 90 parts cyclohexanone. To this solution is added 0.75 parts silica (K-320 precipitated Silica - DeGussa, Inc.) and the resulting mixture is dispersed on a Cowles dissolver at 1000 RPM for 30 minutes. At this point, a 50% concentration solution of the antistatic agent is added and the dispersion carried out for an additional 5 minutes. The anti-static agent used is in accordance with the foregoing general formula wherein $R_1$ is $C_4H_9$, $a$ is 2 and $m$ is 10. The concentration of this anti-static agent is varied to provide transparencies containing 2 ½, 5 and 7 ½ weight percent of the material in the second layer.

The solution/dispersion is coated onto the polyester base sheet and the solvent dried to provide a clear film adherent to the polyester base sheet of about 0.2 mil in thickness.

Three transparencies are prepared by the foregoing procedure and imaged in the conventional manner using a Xerox 6500 Color Copier. Neither cyan static nor hollow characters are observed in any one of the three transparencies having concentrations of the anti-static agent of 2 ½, 5 and 7 ½ percent.

Transparencies using other types of anti-static agents are also prepared, imaged and examined in a similar manner. It is found that some of the other agents eliminate the cyan static problem at the cost of causing hollow characters. In other cases, they do not eliminate cyan static. Those materials that do eliminate cyan static without causing hollow characters at certain concentrations do not do so at others. Thus, the anti-static agent of the present invention is preferred because it can be employed at various concentrations to eliminate cyan static without causing hollow characters in the type of transparency under consideration.

What is claimed is:

1. A transparency for use in electrostatographic copying which comprises:

a) a base layer of a transparent, heat stabilized polyester sheet, b) a second layer adherent to the surface of said polyester sheet of a mixture of an acrylic polymer and a copolymer of vinyl acetate and vinyl chloride said layer having uniformly dispersed therein:

i. particulate silica having a mean particle size of from about 2 to 70 millimicrons in its longest dimension and being present in an amount of from about 0.25 to about 1.5 weight percent of said second layer, and ii. an anti-static agent of a salt formed from an anion of a carboxylic acid having 1 to 37 carbon atoms or a dimeric fatty acid having 12 to 36 carbon atoms and a cation characterized by the formula:

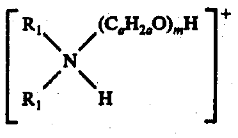

wherein $R_1$ is a saturated straight chained or branched chain aliphatic hydrocarbon radical of 3 to 24 carbon atoms, *a* is 2 or 3 and *m* is a number from 2 to 40.

2. The transparency of claim 1 wherein the thickness of the second layer is from 0.05 to 0.5 mil.

3. The transparency of claim 1 wherein the thickness is from 0.1 to 0.4 mil.

4. The transparency of claim 1 wherein $R_1$ is $C_4H_9$, *a* is 2 and *m* is 10.

5. The transparency of claim 1 wherein the polyester is a highly polymerized ester of terephthalic acid and a glycol of the series $H\text{-}(-O_{2n}-)\text{-}OH$ wherein *n* is a number in the range of from 2 to 10.

6. The transparency of claim 5 wherein the polyester is capable of forming a sheet exhibiting cross and trans direction shrinkage of less than 1.0% when maintained at 170° C for 30 minutes.

7. The transparency of claim 5 wherein the polyester sheet has a thickness of from 2 to 7 mils.

8. The transparency of claim 1 wherein the acrylic resin in the second layer is poly(n-alkyl methacrylate).

9. The transparency of claim 8 wherein the poly (n-alkyl methacrylate) is poly(n-butyl methacrylate).

10. The transparency of claim 1 wherein the weight ratio of the acrylic resin to the vinyl acetate/vinyl chloride copolymer is from 40:60 to 80:20.

11. The transparency of claim 10 wherein the weight ratio is 70:30.

12. The transparency of claim 1 wherein the anti-static agent is present in an concentration of from 2.5 to 12.5 weight percent of the second layer.

13. The transparency of claim 12 wherein the anti-static agent is present in an amount of from 6 to 9 weight percent.

* * * * *